(12) United States Patent
Wu

(10) Patent No.: US 11,955,903 B2
(45) Date of Patent: Apr. 9, 2024

(54) RECTIFICATION AND BOOST-BUCK CONTROL SYSTEM FOR ALTERNATING CURRENT

(71) Applicant: SHENZHEN DOSO Technology Ltd., Shenzhen (CN)

(72) Inventor: Jun Wu, Shenzhen (CN)

(73) Assignee: SHENZHEN DOSO TECHNOLOGY LTD., Shenzhen (CN)

( * ) Notice: Subject to any disclaimer, the term of this patent is extended or adjusted under 35 U.S.C. 154(b) by 320 days.

(21) Appl. No.: 17/476,609

(22) Filed: Sep. 16, 2021

(65) Prior Publication Data
US 2022/0360191 A1 Nov. 10, 2022

(30) Foreign Application Priority Data

May 6, 2021 (CN) .......................... 202110490506.5

(51) Int. Cl.
*H02M 1/088* (2006.01)
*H02M 7/219* (2006.01)

(52) U.S. Cl.
CPC ........... *H02M 7/219* (2013.01); *H02M 1/088* (2013.01)

(58) Field of Classification Search
CPC .................................................. H02M 7/219
See application file for complete search history.

(56) References Cited

U.S. PATENT DOCUMENTS

| | | | | |
|---|---|---|---|---|
| 4,247,887 A * | 1/1981 | Chin | ...................... | H02M 5/271 363/37 |
| 8,525,491 B2 * | 9/2013 | Iwai | ...................... | H02J 7/1492 322/27 |
| 2009/0102437 A1 * | 4/2009 | Nakagawa | ................ | H02P 9/48 323/217 |
| 2011/0215773 A1 * | 9/2011 | Iwai | ......................... | H02P 9/48 322/28 |
| 2013/0051097 A1 * | 2/2013 | Katsumata | .......... | H02M 7/1626 363/85 |

(Continued)

FOREIGN PATENT DOCUMENTS

| | | | | |
|---|---|---|---|---|
| EP | 2023476 A2 * | 2/2009 | .......... | H02M 1/4233 |
| EP | 2362535 A1 * | 8/2011 | ............ | H02J 7/1461 |

(Continued)

OTHER PUBLICATIONS

First OA of JP application No. 2021-154635 dated Jul. 5, 2022.

*Primary Examiner* — Sisay G Tiku
(74) *Attorney, Agent, or Firm* — Andrew C. Cheng

(57) ABSTRACT

A rectification and boost-buck control system for alternating current, includes a processor, a commutation detection circuit, a chopper circuit and a switch circuit. The chopper circuit includes upper bridge elements connected to corresponding phases of the alternating current. The switch circuit includes lower bridge elements connected to the upper bridge elements. The commutation detection circuit is configured to detect commutation signals. Based on the communication signals and current output current and/or current rectified voltage, the processor is capable of outputting a conduction angle control signal to the chopper circuit and output a switch control signal to the switch circuit to adjust on-off time of the chopper circuit and the switch circuit to thereby adjust the current output current and/or the current rectified voltage.

15 Claims, 7 Drawing Sheets

(56) References Cited

U.S. PATENT DOCUMENTS

2016/0118831 A1\* 4/2016 Katsumata .......... H02J 7/00712
　　　　　　　　　　　　　　　　　　　　　　　　　320/107

FOREIGN PATENT DOCUMENTS

| EP | 3163737 A1 | * | 5/2017 | ............. B60L 53/12 |
|---|---|---|---|---|
| JP | 2001025175 A | | 1/2001 | |
| JP | 2001157497 A | * | 6/2001 | |
| JP | 2002233072 A | | 8/2002 | |
| JP | 2005198426 A | | 7/2005 | |
| JP | 2008259372 A | | 10/2008 | |
| JP | 4254544 B2 | * | 4/2009 | |
| JP | 2010148341 A | | 7/2010 | |
| WO | 2016151851 A1 | | 9/2016 | |

\* cited by examiner

| acquiring a current output current detected by a current detection circuit and a current rectified voltage detected by a voltage feedback circuit | S101 |

| acquiring a commutation signal detected by a commutation detection circuit, and outputting a conduction angle control signal to an upper bridge arm circuit of the alternating current and outputting a switch control signal to a lower bridge arm circuit of the alternating current according to the current output current and/or the current rectified voltage and based on the commutation signal | S103 |

| turning on upper bridge elements in the upper bridge arm circuit and lower bridge elements in the lower bridge arm circuit according to a target commutation time sequence, and adjusting on-off time of the upper bridge elements and the lower bridge elements to thereby adjust the current output current and/or the current rectified voltage | S105 |

FIG. 7

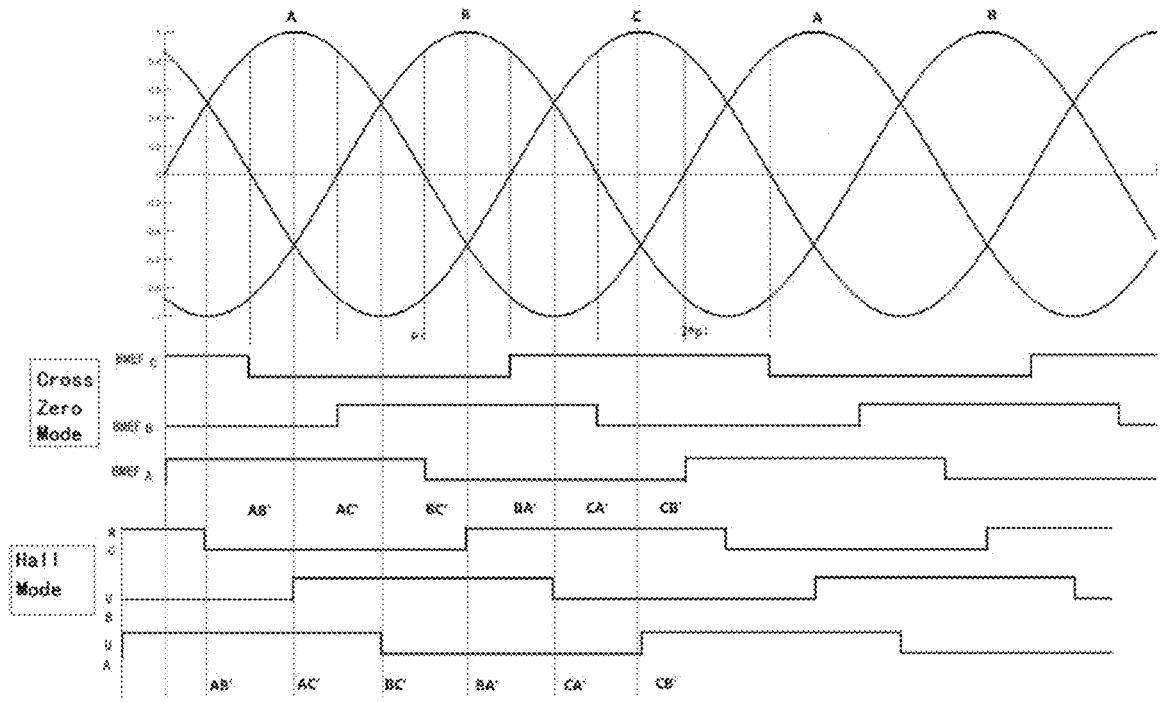

FIG. 8

RECTIFICATION AND BOOST-BUCK CONTROL SYSTEM FOR ALTERNATING CURRENT

CROSS REFERENCE TO RELATED APPLICATIONS

This non-provisional patent application claims priority under 35 U.S.C. § 119(a) from Patent Application No. 2021104905065 filed in The People's Republic of China on May 6, 2021.

FIELD OF THE INVENTION

The present invention relates to alternating current rectification and boost-buck circuit and control method.

BACKGROUND OF THE INVENTION

A traditional alternating current (AC) rectifier circuit usually adopts a rectifier bridge consisted of diodes which are not controllable. Another traditional AC rectifier circuit adopts upper and lower bridges both of which are consisted of silicon controlled rectifiers, which can only step down voltage.

It is desirable to provide an improved AC rectifier circuit which is capable of stepping down the output voltage when the AC voltage is high, and boosting the output voltage when the AC voltage is low.

SUMMARY OF THE INVENTION

In one aspect, the present invention provides a rectification and boost-buck control system for an alternating current which comprises a processor; a commutation detection circuit connected between the processor and the alternating current and configured to detect commutation signals; and a rectifier circuit comprising an upper bridge arm circuit and a lower bridge arm circuit respectively connected to corresponding phases of the alternating current, the upper bridge arm circuit comprising a chopper circuit which comprises an upper bridge element connected to the corresponding phase of the alternating current, the lower bridge arm circuit comprising a switch circuit connected between the processor and the chopper circuit, the switch circuit comprising a lower bridge element connected the upper bridge element. Based on the communication signals and current output current and/or current rectified voltage, the processor is capable of outputting a conduction angle control signal to the chopper circuit and output a switch control signal to the switch circuit to adjust on-off time of the chopper circuit and the switch circuit to thereby adjust the current output current and/or the current rectified voltage.

In another aspect, the present invention provides a control method for alternating current which comprises:
acquiring a current output current detected by a current detection circuit and a current rectified voltage detected by a voltage feedback circuit;
acquiring a commutation signal detected by a commutation detection circuit, and outputting a conduction angle control signal to an upper bridge arm circuit of the alternating current and outputting a switch control signal to the lower bridge arm circuit of the alternating current according to the current output current and/or the current rectified voltage and based on the commutation signal; and
turning on upper bridge elements in the upper bridge arm circuit and lower bridge elements in the lower bridge arm circuit according to a target commutation time sequence, and adjusting on-off time of the upper bridge elements and the lower bridge elements to thereby adjust the current output current and/or the current rectified voltage.

In the embodiments of the present invention, the rectifier circuit includes an upper bridge arm circuit and a lower bridge arm circuit that are connected to the corresponding phases of the AC. Based on the communication signals and current output current and/or current rectified voltage, the processor is capable of outputting a conduction angle control signal to the chopper circuit and output a switch control signal to the switch circuit to adjust on-off time of the chopper circuit and the switch circuit to thereby adjust the current output current and/or the current rectified voltage. Compared with the traditional AC rectifier circuit, the control system/method of the present invention can reduce the conduction voltage drop and improve the power generation efficiency. The output is flexible and variable, and the efficiency of the AC is improved.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 7 is a flowchart of an alternating current control method in an embodiment;

FIG. 8 is a logic characteristic diagram of commutation at a natural commutation point in an embodiment;

DETAILED DESCRIPTION OF THE PREFERRED EMBODIMENTS

Figure 1:
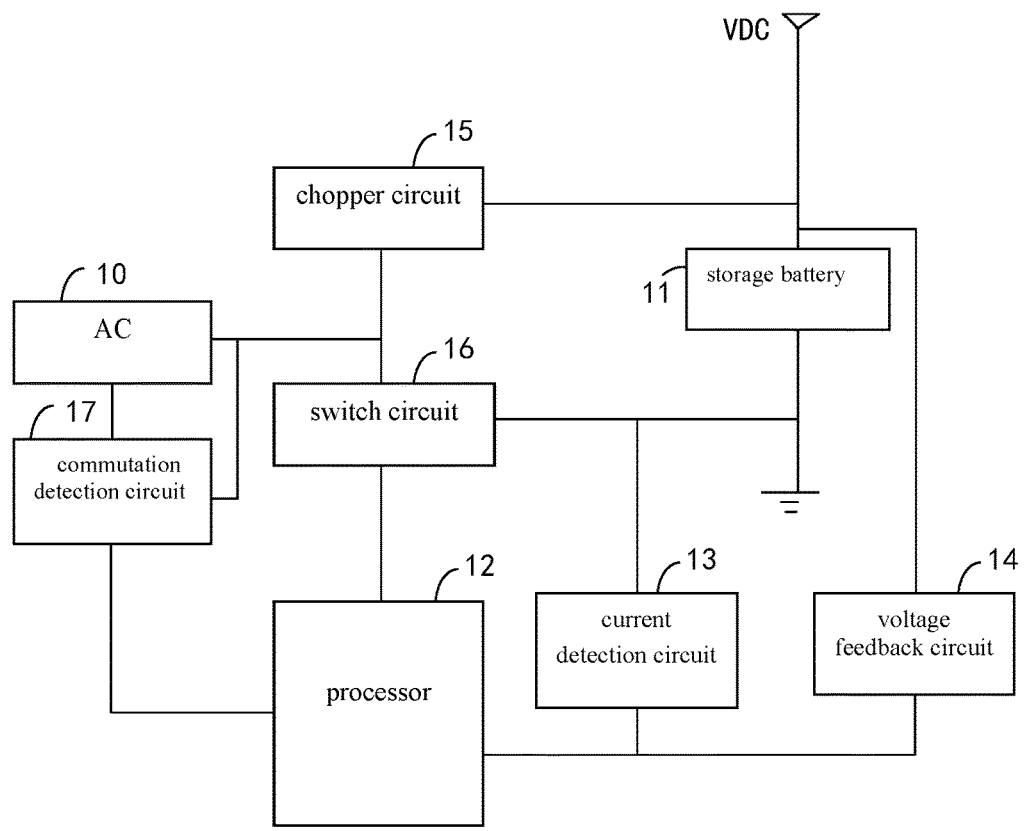
FIG. 1 is a schematic diagram of an alternating current rectification and boost-buck control system in an embodiment.

The technical solution of the present application will be further elaborated below in conjunction with the drawings and specific embodiments of the specification.

Unless otherwise defined, all technical and scientific terms used herein have the same meaning as commonly understood by those skilled in the technical field of the present invention. The terminology used in the description of the present invention herein is only for the purpose of describing specific embodiments, and is not intended to limit the implementation of the present invention. The term "and/or" as used herein includes any and all combinations of one or more related listed items.

In the description of the present invention, it should be understood that the orientation or positional relationship indicated by the terms "center", "upper", "lower", "front", "rear", "left", "right", "vertical", "horizontal", "top", "bottom", "inner", "outer" etc is based on the orientation or positional relationship shown in the drawings, and is only for the convenience of describing the present invention and simplifying the description, rather than indicating or implying the referred device or element must have a specific orientation, be constructed and operated in a specific orientation, and therefore cannot be understood as a limitation of the present invention. In the description of the present invention, unless otherwise specified, "plurality" means two or more.

In the description of the present invention, it should be noted that, unless otherwise clearly specified and limited, the terms "installation" and "connection" should be understood in a broad sense, for example, it can be a fixed connection, a detachable connection or integrally connected. It can be directly connected, or indirectly connected through an intermediate medium. For those of ordinary skill in the art, the specific meanings of the above-mentioned terms in the present invention can be understood in specific situations.

FIG. 1 is a schematic diagram of a rectification and boost-buck control system for alternating current (AC) according to an embodiment of the present application. The AC may comprise multiple phases and be supplied by any one of a generator, a transformer and an alternating power.

Referring to FIG. 1, the control system is connected between the AC 10 and a storage battery 11. The control system includes a processor 12, a commutation detection circuit 17 connected between the processor 12 and the AC 10, a rectifier circuit connected to the AC 10, and a current detection circuit 13 connected between the processor 12 and the rectifier circuit, and the voltage feedback circuit 14 connected between the processor 12 and the rectifier circuit. The rectifier circuit includes an upper bridge arm circuit and a lower bridge arm circuit respectively connected to the corresponding phases of the AC 10. In some embodiments, the upper bridge arm circuit is a chopper circuit 15, and the lower bridge arm circuit is a switch circuit 16 connected between the processor 12 and the chopper circuit 15.

In the embodiment, the rectifier circuit includes an upper bridge arm circuit and a lower bridge arm circuit that are connected to the corresponding phases of the AC 10. The upper bridge arm circuit is the chopper circuit 15, and the lower bridge arm circuit is a switch circuit 16 connected between the processor 12 and the chopper circuits 15. By setting the switch circuit 16 in the lower bridge arm of each phase winding, and by turning on or off the switch circuit 16, a corresponding branch formed by the chopper circuit 15 and the switch circuit 16 can be turned on or off accordingly to thereby adjust power generation voltages and reduce losses.

Figure 2:
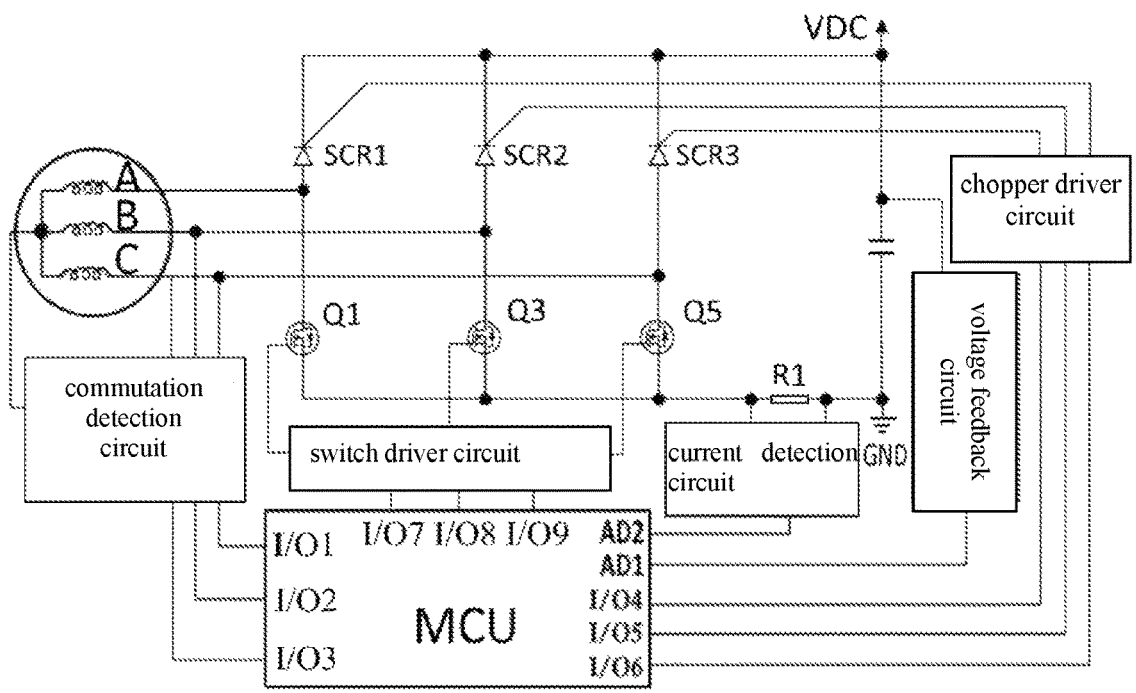
FIG. 2 to FIG. 6 are schematic diagrams of AC rectification and boost-buck control systems provided by different embodiments.
Figure 3:
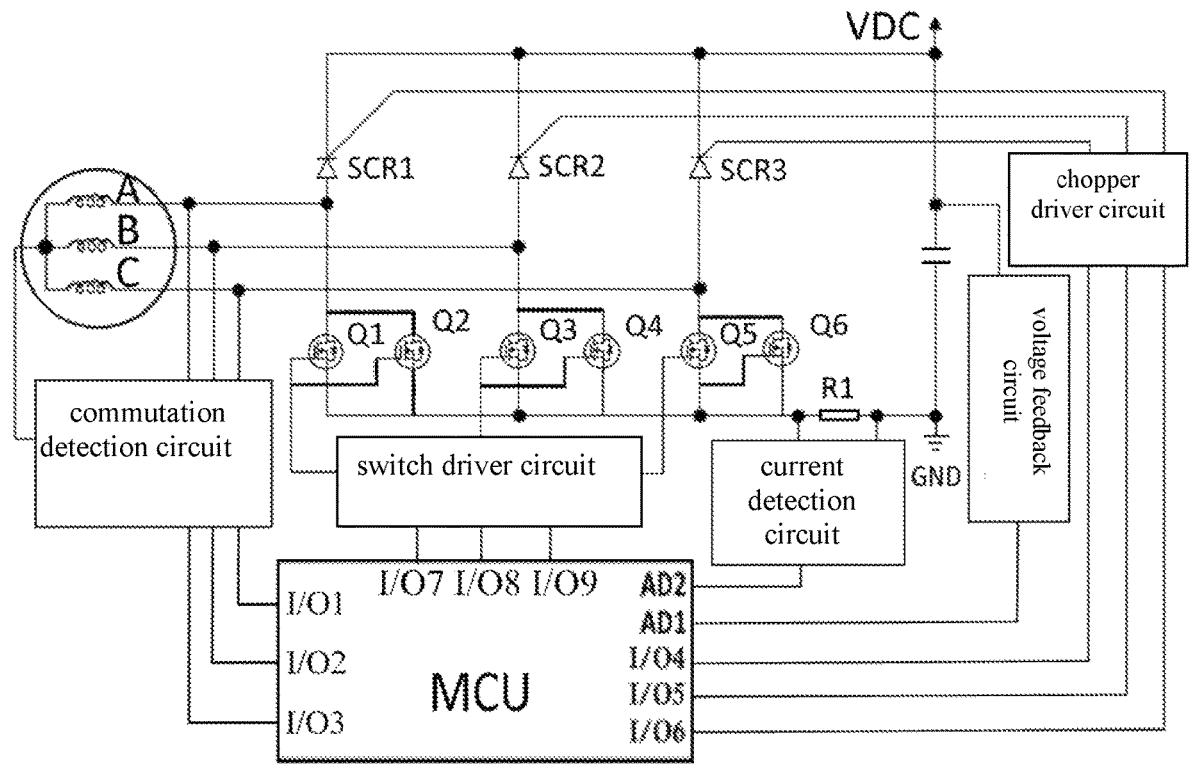
Figure 4:
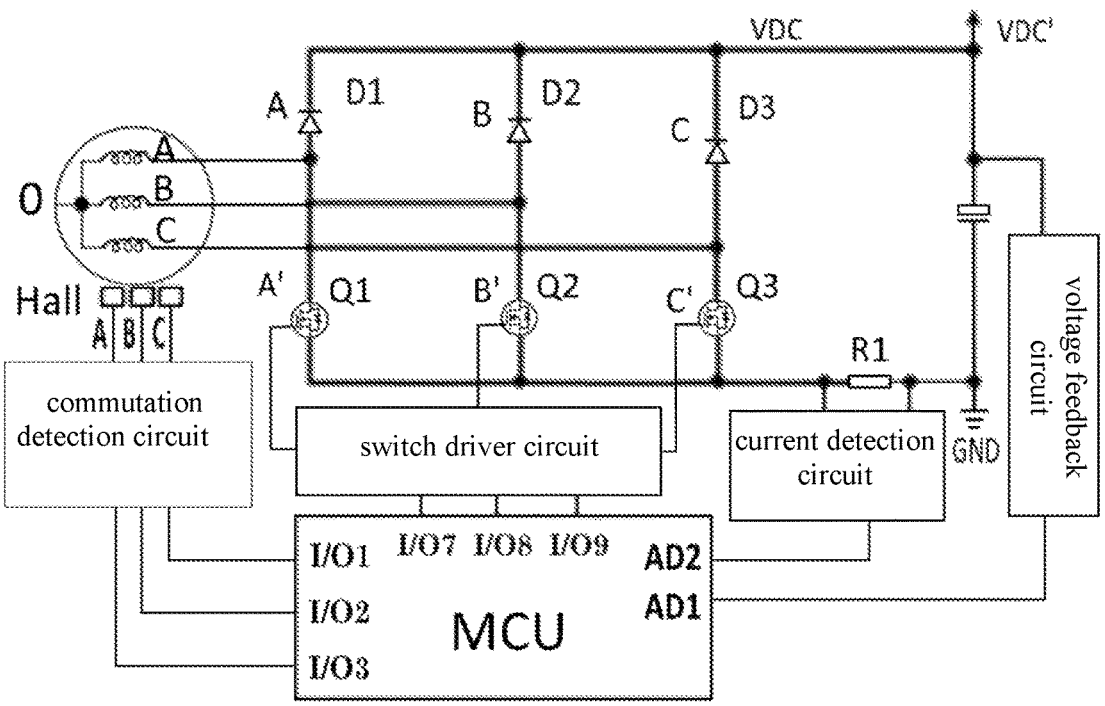
Figure 5:
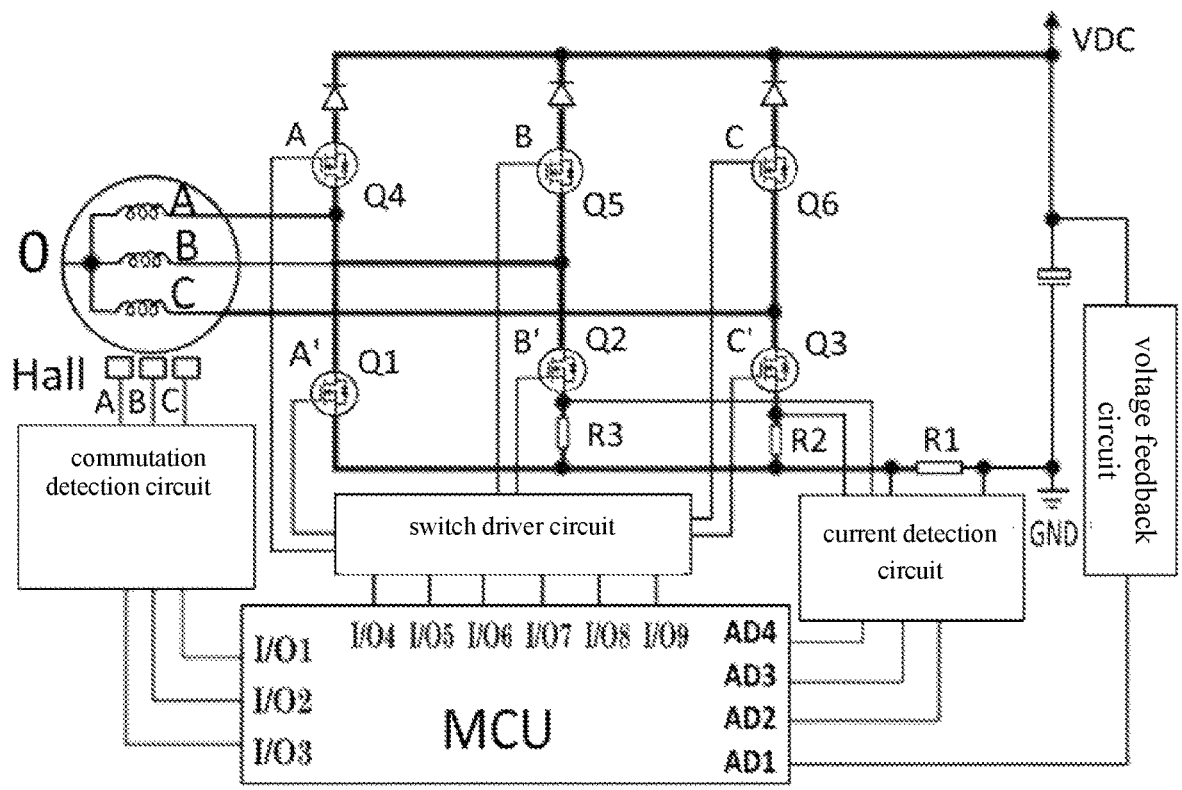
Figure 6:
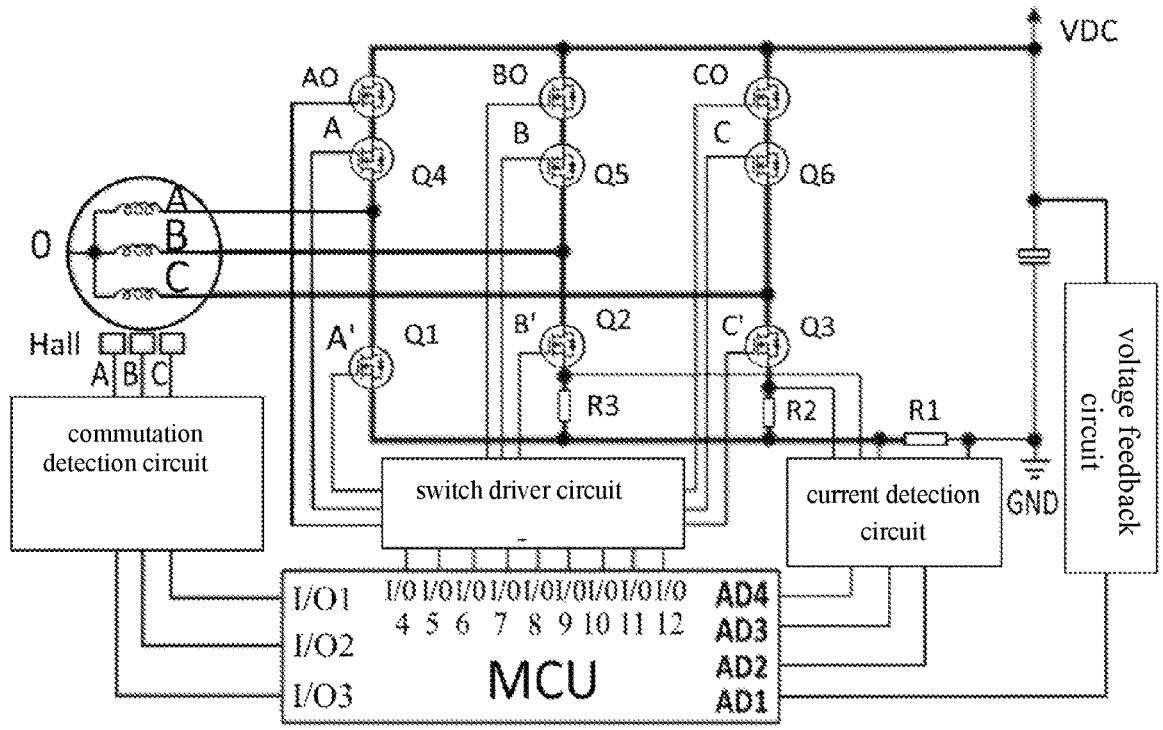

In some embodiments, the chopper circuit 15 includes upper bridge elements respectively connected to the phases of the AC 10, and the switch circuit 16 includes lower bridge elements respectively connected to the upper bridge elements. The upper bridge element may be a silicon controlled rectifiers (SCR) or a field effect transistor (FET), and the lower bridge element may be a field effect transistor, a diode or a SCR. Referring to FIG. 2 which is a schematic circuit diagram of the AC rectification and boost-buck control system, the chopper circuit 15 includes silicon controlled rectifiers SCR1, SCR2, SCR3 connected to the phases of the AC 10 respectively. The processor 12 detects the commutation signal through the commutation detection circuit 17. Based on the commutation signal, the processor 12 outputs a conduction angle control signal to the chopper circuit 15 and outputs a switch control signal to the switch circuit 16 in response to the current output current and/or the current rectified voltage, whereby adjusting the on-off time of the SCRs and the switch circuit 16 to adjust the current output current and the current rectified voltage. The lower bridge element in the switch circuit 16 is preferably a field effect transistor. Compared with the lower bridge element adopting a diode, the lower bridge element adopting a field effect transistor can reduce the conduction voltage drop and improve the power generation efficiency. Referring to FIGS. 3 to 6 which are circuit diagrams of AC rectification and boost-buck control systems in different embodiments. As shown in FIG. 3, the upper bridge element is a silicon controlled rectifier SCR1, SCR2, SCR3, and each lower bridge element includes two field effect transistors Q1~Q6 connected in parallel, which can increase the control range. As shown in FIG. 4, the upper bridge element adopts a diode D1~D3, and the lower bridge element adopts a field effect transistor Q1~Q3. As shown in FIG. 5, the upper bridge element and the lower bridge element adopt field effect transistors Q1~Q6, respectively. The drains and sources of the two field effect transistors of the upper bridge element and the lower bridge element in the same branch are connected in opposite directions. In this embodiment, the upper bridge arm circuit uses the field effect transistors the switching frequency of which can be faster than the SCRs, avoiding the excessive high voltage and excessive reverse current caused by slow switching of the SCRs. Optionally, the two lower bridge components can further comprise current sampling resistors R2 and R3 respectively. The current sampling resistors R2 and R3 are respectively connected to the third sampling port AD3 and the fourth sampling port AD4 of the processor 12. Through the current sampling resistors R2 and R3, the current can be detected. When the current is too large, the control system stops voltage boosting. Alternatively, a current sensor can be used at the upper bridge arm circuit to detect the current instead of using the sampling resistors at the lower bridge arm circuit, which can more accurately obtain the current value of the upper bridge arm circuit. As shown in FIG. 6, each upper bridge element includes two N-channel field effect transistors, and the connection directions of the drains and sources of the two field effect transistors are opposite. Specifically, the connection way of an N-channel field effect transistor is that the drain is on the top and the source is on the bottom. The connection way of the other N-channel field effect transistor is that the drain is on the bottom and the source is on the top. The circuit can be used to drive the motor and do PWM speed regulation.

In some embodiments, the commutation signal is zero-crossing signal, and the commutation detection circuit 1 is a zero-crossing detection circuit configured to detect the zero-crossing information of the phase voltage of the AC 10 and determine the phase relationship between voltages of A phase winding, B phase winding, C phase winding of the AC 10 based on the detected zero-crossing information. The processor 12 detects the current output current of the phase voltage of the AC 10 through the commutation detection circuit 17, and when the voltage value of a certain phase of the AC 10 is equal to zero, the processor 12 outputs a conduction angle control signal to the chopper circuit 15 and the switch circuit 16 based on the current output current and/or the current voltage, and adjusts the on-off time of the SCRs in the chopper circuit 15 and the switches in the switch circuit 16 to thereby adjust the current output current and/or the current rectified voltage until the commutation detection circuit 17 detects that the voltage of the other phase of the AC 10 crosses the zero point again and then the same logic control is repeated. The processor 12 turns on the SCRs in the chopper circuit 15 and the field effect transistors in the switch circuit 16 in the order of AB, AC, BC, BA, CA, and CB according to the zero-crossing signals of the three-phase voltages of A, B, and C of the alternating current 10 to make the rectifier branches consisted of the corresponding SCRs and the field effect transistors be conducted/closed. In some other embodiments, the commutation signal detected by the commutation detection circuit 17 is a natural commutation point signal. The natural commutation point refers to a position that is 30 degrees ahead of the position of the zero crossing point of the electromotive force. The commutation detection circuit 17 includes hall sensors respectively installed at the setting positions of each phase of the alternating current.

Preferably, the AC 10 is a three-phase alternating current 10, and the chopper circuit 15 includes the first silicon controlled rectifier SCR1, the second silicon controlled rectifier SCR2 and the third silicon controlled rectifier SCR3 which are respectively connected to the A-phase winding, the B-phase winding, and the C-phase winding of the three-phase AC 10. The switch circuit 16 includes a first switch, a second switch, and a third switch that are connected to the first silicon controlled rectifier SCR1, the second silicon controlled rectifier SCR2, and the third silicon controlled rectifier SCR3, respectively. The processor 12 is connected with the first switch, the second switch and the third switch through a switch driver circuit. The processor 12 includes multiple input/output terminals, and the switch circuit 16 is connected between the input/output terminals of the processor 12 and the chopper circuit 15. For ease of description and distinction, the multiple input/output terminals (I/O) via which the processor 12 is connected to the switch circuit 16 are respectively identified as the seventh input/output terminal I/O7, the eighth input/output terminal I/O8, and the ninth input/output terminal I/O9. The first switch is connected between the seventh input/output terminal I/O7 and the first silicon controlled rectifier SCR1, the second switch is connected between the eighth input/output terminal I/O8 and the second silicon controlled rectifier SCR2, and the third switch is connected between the ninth input/output terminal I/O9 and the third silicon controlled rectifier SCR3. When the processor 12 detects that the phase voltage of the alternating current is in the positive half cycle of the sine wave through the commutation detection circuit 17, the processor 12 outputs a conduction angle control signal to the silicon controlled rectifier of the upper bridge arm of the corresponding phase to control the on-off time of the silicon controlled rectifier to thereby adjust the rectified voltage. When the processor 12 detects that the phase voltage is in the negative half cycle of the sine wave through the commutation detection circuit 17, it outputs drive signals via the seventh input/output terminal I/O7, the eighth input/output terminal I/O8, and the ninth input/output terminal I/O9 respectively to turn on the corresponding switches of the lower bridge arm of the corresponding phase, and the corresponding branches consisted of the corresponding silicon controlled rectifiers and switches are located are closed/conducted. Thus, the loss caused by the voltage drop can be reduced and the rectification efficiency can be improved. In some embodiments, the first switch, the second switch and the third switch are respectively field effect transistors.

Preferably, the rectifier circuit further includes a chopper driver circuit connected between the processor 12 and the chopper circuit 15. The processor 12 outputs the conduction angle control signal to the chopper driver circuit which controls the opening or closing of the silicon controlled rectifier of the upper bridge arm of each phase. The processor 12 includes a plurality of input/output terminals, and the chopper driver circuit is connected between the input/output terminals of the processor 12 and the chopper circuit 15. For ease of description and distinction, the multiple input/output terminals of the processor 12 which are connected with the chopper driver circuit are identified as the fourth input/output terminal I/O4, the fifth input/output terminal I/O5, and the sixth input/output terminal I/O6. In some embodiment, the rectifier circuit further includes a switch driver circuit connected between the processor 12 and the switches. The processor 12 outputs drive signals to the switch driver circuit through the seventh input/output terminal I/O7, the eighth input/output terminal I/O8 and the ninth input/Output terminal I/O9 respectively such that the switch driver circuit controls the opening or closing of the switches of the lower bridge arms of the phases.

In some embodiment, the AC control system further includes a current detection circuit 13 connected between the processor 12 and the chopper circuit 15. The AC control system further includes a voltage feedback circuit 14 connected between the processor 12 and the chopper circuit 15. The processor 12 includes multiple feedback terminals. For ease of description and distinction, the feedback terminal of the processor 12 connected with the voltage feedback circuit 14 is identified as the first feedback terminal AD1, and the feedback terminal of the processor 12 connected with the current detection circuit 13 is identified as the second feedback terminal AD2. The processor 12 is capable of detecting the current output current output by the rectifier circuit in real time through the current detection circuit 13 and the current rectified voltage output by the rectifier circuit in real time through the voltage feedback circuit 14. When the commutation detection circuit 17 detects that the phase voltage is in the positive half cycle of the sine wave, according to the voltage feedback and the current detection value output by the rectifier circuit, the matched conduction angle control signal is output to the SCR of the upper bridge arm of the corresponding phase for voltage regulation.

In some embodiment, the commutation detection circuit 17 includes multiple paths respectively corresponding to the corresponding phases of the AC 10 in a one-to-one manner. The processor 12 includes a plurality of input/output terminals, and the commutation detection circuit 17 is connected between the input/output terminals of the processor 12 and the AC 10. For ease of description and distinction, the multiple input/output terminals of the processor 12 connected to the commutation detection circuit 17 are identified as the first input/output terminal I/O1, the second input/output terminal I/O2, and the third input/output terminal I/O3. By providing the commutation detection circuit 17 corresponding to each of the phases in a one-to-one manner, the positive and negative half cycles of each phase can be independently detected and judged, whereby the control accuracy can be improved.

The AC control system provided by the above-mentioned embodiments of the present application uses a chopper circuit 15 and a switch circuit 16 respectively as the upper arm circuit and the lower arm circuit of each phase winding of the AC 10, and detects that the current of each phase is in a positive half cycle or in a negative half cycle to control the opening or closing of the switch circuit 16 of the lower bridge arm accordingly, so as to greatly reduce the loss caused by the voltage drop of the chopper circuit 15 when the current of each phase is in the negative half cycle. The control method is more flexible and the rectification efficiency is improved.

Referring to FIG. 7, the present application also provides an alternating current control method applied to a processor, including:

S101, acquiring a current output current detected by the current detection circuit and a current rectified voltage detected by the voltage feedback circuit;

S103: acquiring the commutation signal detected by the commutation detection circuit, and outputting a conduction angle control signal to the upper arm circuit of the alternating current and outputting a switch control signal to the lower arm circuit of the alternating current according to the current output current and/or the current rectified voltage and based on the commutation signal;

S105: turning on the upper bridge elements in the upper bridge arm circuit and the lower bridge elements in the lower bridge arm circuit according to the target commutation time sequence, and adjusting the on-off time of the upper bridge elements and the lower bridge elements to thereby adjust the current output current and the current rectified voltage.

In the present embodiment, the processor detects the commutation signal through the commutation detection circuit, outputs the conduction angle control signal to the upper bridge arm circuit according to the current output current and/or the current rectified voltage, and outputs the switch control signal to the lower bridge arm circuit. The current output current and rectified voltage can be adjusted by adjusting the on-off time of the upper bridge element and the lower bridge element. The output is flexible and variable, and the efficiency is improved.

In some embodiments, the upper bridge arm circuit can adopt a silicon controlled rectifier or a field effect transistor of which the on-off time is adjustable, and the lower bridge element can adopt a field effect transistor, a diode or a silicon controlled rectifier according to different application requirements. The upper bridge arm circuit is the channel through which the current flows out of the winding of the AC 10 which is realized by the unidirectional conduction of the silicon controlled rectifier in the upper bridge arm circuit. The lower bridge arm circuit is the channel through which the current flows into the winding of the AC 10. The lower bridge element can preferably use a field effect transistor to make the current flow back to the winding of the AC 10, i.e., the windings of a generator/motor. When the gate pole (G pole) of the field effect transistor is used to control the conduction, the voltage drop of the lower bridge can be reduced. The voltage drop of the lower bridge that uses the field effect transistor is less than that of the lower bridge that uses diodes and silicon controlled rectifiers. Furthermore, the field effect transistor has a freewheeling/flyback diode which has the function of making the current flow back through the lower bridge. The conduction of the field effect transistor can increase the current return channel and reduce the voltage drop of the lower bridge, which not only reduces the power consumption, but also enables a power generation output when the electromotive force is low.

Figure 9:
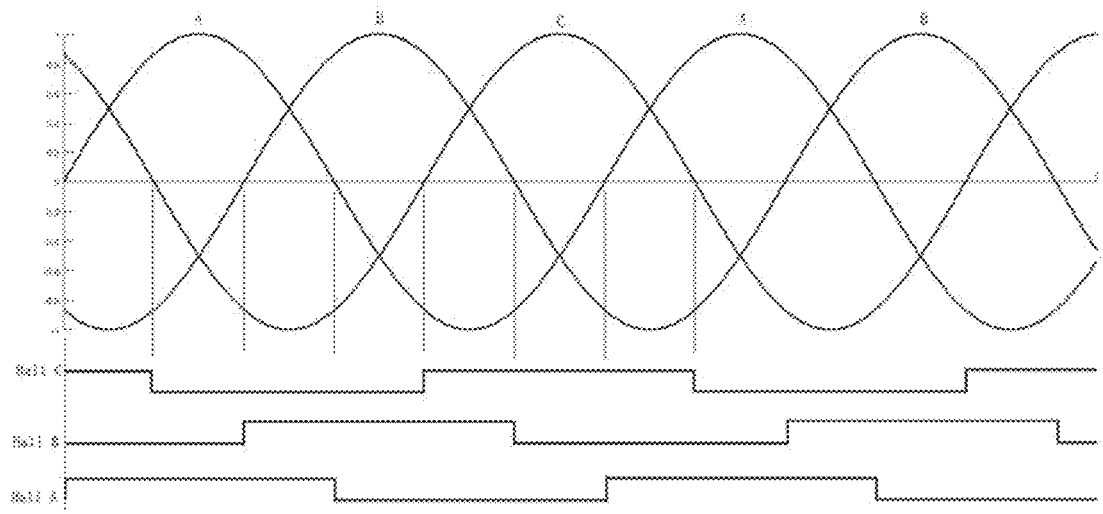
FIG. 9 is a logic characteristic diagram of the commutation at the zero-crossing point of the electromotive force in an embodiment.

In some embodiments, the lower bridge element adopts a field effect transistor, and the commutation signal is a natural commutation point signal. Alternatively, the lower bridge element adopts a diode, and the commutation signal is a zero-crossing signal. Alternatively, the lower bridge element adopts a silicon controlled rectifier, and the commutation signal is a zero-crossing point signal or a natural commutation point signal. In the present invention, the zero-crossing point refers to the position of the zero-crossing point of the electromotive force. The natural commutation point refers to a position 30 degrees ahead of the zero crossing point of the electromotive force. When the lower bridge adopts the field effect transistor, the commutation strategy adopts natural commutation point commutation. FIG. 8 shows a logic characteristic diagram of natural commutation. It is assumed that the alternating current changes in the order of ABC. The commutation sequence of the six natural commutation points in one cycle is AB', AC', BC', BA', CA', CB', which makes the output voltage relatively stable. Conversely, assuming that the alternating current changes in the order of CBA, the commutation sequence is the reverse sequence CB', CA', BA', BC', AC', AB'. When the lower bridge adopts a silicon controlled rectifier, and the commutation signal is a zero-crossing signal or a natural commutation point signal. FIG. 9 shows a logic characteristic diagram of the zero-crossing commutation. The zero-crossing commutation can be performed at a point with a higher voltage, so that electricity can be generated even when the electromotive force is too low, and it can also prevent the silicon controlled rectifier from commutating, when the voltage is too low, to cause malfunction. When the lower bridge adopts a silicon controlled rectifier, the commutation strategy may be natural commutation or zero-crossing commutation, which respectively have similar technical effects to the corresponding commutation strategy adopted in the foregoing embodiment, and will not be repeated here.

Optionally, before step S105, the method further includes: determining the conduction/turn on sequence according to the direction of the voltage change of the A-phase, B-phase, and C-phase in the alternating current, and adding overlapping commutation in the middle of each commutation according to the turn-on sequence to obtain the target commutation time sequence. Take the alternating current in the order of ABC phase as an example. The turn-on sequence of the windings in an electric cycle is AB', AC', BC', BA', CA', CB'. After adding the overlapping commutation in the middle of each commutation, the target commutation time sequence is AB', AB'C', AC', ABC', BC', BC'A', BA', BCA', CA', CA'B', CB', CAB'. When the overlap commutation is adopted, the two-phase conduction first transitions to the three-phase conduction, and then becomes the other two-phase conduction, so that the commutation transition can be smoother and the current and voltage fluctuations are small. Preferably, the added overlapping commutation can be used when the conduction angle of the silicon controlled rectifier is of the maximum power, which can further improve the performance.

In some embodiments, the commutation detection circuit adopts a Hall sensor (Hall element). For example, when the commutation signal is a zero-crossing signal, the commutation detection circuit adopts a Hall element installed at the position of the electromotive force zero-crossing. When the commutation signal is a natural commutation signal, the commutation detection circuit can adopt a Hall element installed at a position of 30 degrees before the zero-crossing point of the electromotive force. Optionally, the commutation detection circuit can also use a zero-crossing detection circuit to acquire the phase voltages of the three-phase windings, and compare the phase voltages with the voltage of the three-phase center point to obtain the zero-crossing points.

Optionally, before acquiring the commutation signal detected by the commutation detection circuit, the method includes:

Judging whether the electromotive force is higher than the set value according to the current rectified voltage;

When the electromotive force is higher than the set value, the natural commutation point signal detected by the commutation detection circuit is acquired as a commutation signal;

When the electromotive force is lower than the set value, the zero-crossing signal detected by the commutation detection circuit is acquired as a commutation signal.

By adopting the commutation strategy of zero-crossing commutation when the electromotive force is low, and adopting the commutation strategy of natural commutation when the electromotive force is high, the output is more flexible and variable, and the efficiency can be further improved.

Optionally, based on the commutation signal, outputting a conduction angle control signal to the upper arm circuit of the AC and outputting a switch control signal to the lower arm circuit of the alternating current according to the current output current and/or the current rectified voltage includes:

Determining the delay ratio according to the current power demand value, delaying the commutation signal according to the delay ratio, and outputting the conduction angle control signal to the upper arm circuit of the alternating current and the switch control signal to the lower arm circuit of the alternating current based on the delayed commutation signal and the current output current and/or the current rectified voltage.

Generally, when the current power demand value is the maximum power demand value or exceeds a predetermined power threshold value, no commutation delay is performed and the commutation is performed immediately after the commutation signal is obtained. When the current power demand value is small, the delay ratio can be determined according to the ratio between the real-time conversion of the current power demand value and the maximum power demand value, and the commutation signal is delayed according to the delay ratio, and the silicon controlled rectifiers are controlled to turn on after being delayed a corresponding time, the phase angle corresponding to the delayed time is the conduction angle of the silicon controlled rectifier, and the output voltage and power can be changed from maximum to minimum by adjusting the conduction angle.

Optionally, based on the commutation signal, outputting a conduction angle control signal to the upper arm circuit of the AC and outputting a switch control signal to the lower arm circuit of the alternating current according to the current output current and/or the current rectified voltage includes:

According to an advanced estimation strategy, the commutation point is set in advance by an angle. Based on the pre-set commutation point, a conduction angle control signal is output to the upper arm circuit and a switch control signal is output to the lower arm circuit of the alternating current according to the current output current and/or the current rectified voltage.

Optionally, the advanced estimation strategy can be determined according to the relationship between the timing of the processor, the position of the Hall element, and the frequency of the AC power. Setting the angle of the commutation signal in advance according to the advanced estimation strategy can avoid the problems caused by the error of the commutation signal.

Optionally, the lower bridge element is a field effect transistor. Outputting the switch control signal to the lower bridge arm circuit of the alternating current includes:

Outputting a switch control signal to the field effect transistors in the lower arm circuit of the alternating current;

When the voltage amplitude of the alternating current is lower than the load voltage or the frequency of the alternating current is lower than the set value, and the current output current is less than the set value, the boost is performed through the boost circuit and the inductance inside the alternating current.

Optionally, the load voltage can be the voltage of the storage battery 11 to be charged. The processor 12 can adjust the boosting through PWM chopping, and judge, via current, voltage, and speed feedback, whether there is a need to boost and whether it is suitable for boosting. For example, when the bridges of AB' has an electromotive force but the amplitude is small (less than VDC), the G poles of the two bridges of AB' are controlled to try to close/conduct the two bridges of AB'. When the upper bridge A adopts a silicon controlled rectifier, the upper bridge A cannot be closed/conducted since the forward voltage is not enough and the silicon controlled rectifier will not conduct reversely. The lower bridge B' can be closed/conducted/turned on, but no return flow can be formed by the lower bridge B' itself if the lower bridge of A'(Q1) is closed/conducted/turned on, the current can flow back to the winding from the lower bridge of B', to avoid the positive electromotive force generated by the A-phase winding to flow to GND to form a short circuit. Since there is no loop, no current flows from the terminal of VDC to GND. During this time period, a chopping control is performed for the lower bridge of A' to form a boost working mode. When the lower bridge of A' is closed/conducted/turned on, the winding of the generator is charged with a current flowing from the lower bridge A' to the lower bridge B', and a relatively large current is generated. When the lower bridge of A' is turned off, the current in the winding will continue to flow, which results in a greater electromotive force in the direction of AB' being generated to rush the SCR of the upper bridge of A. Thus, when the lower bridge A' is closed/conducted/turned on, energy is stored, and the SCR of the upper bridge A will be turned off since there is no forward voltage drop. When the lower bridge A' is turned off, the first SCR of the upper bridge A will be turned on and the storage battery 11 is charged.

Figure 10:
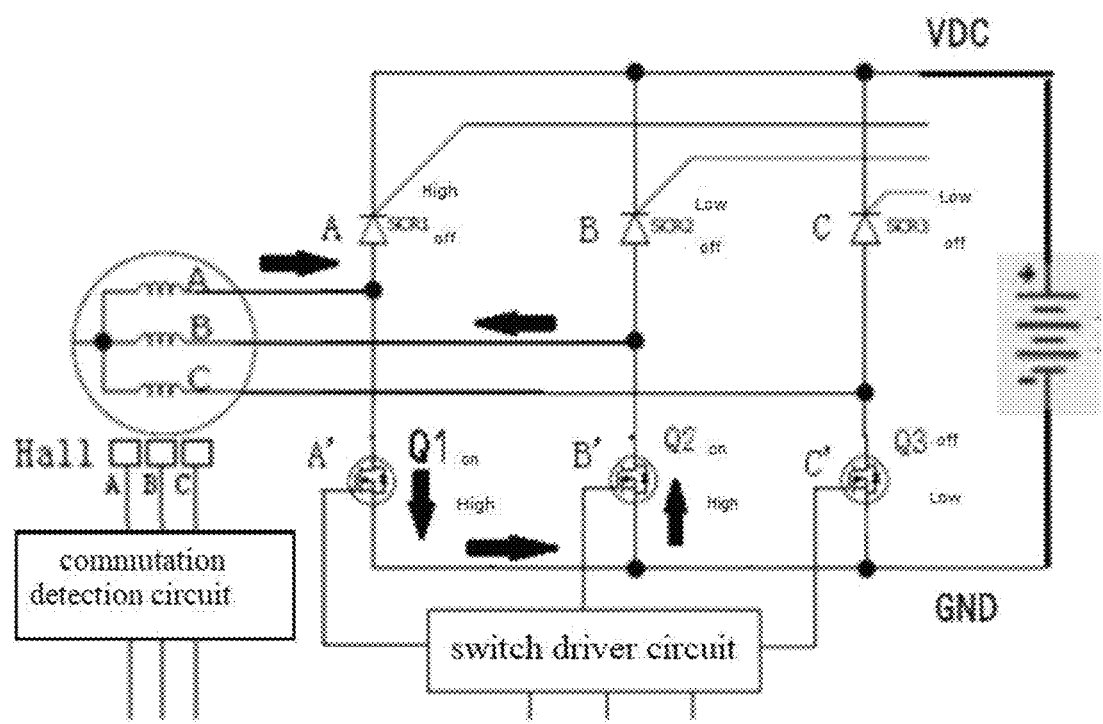
FIG. 10 and FIG. 11 are the current diagrams of switching at A' when the winding AB' is turned on and when the PWM chopping boost is at the lower bridge A'.
Figure 11:
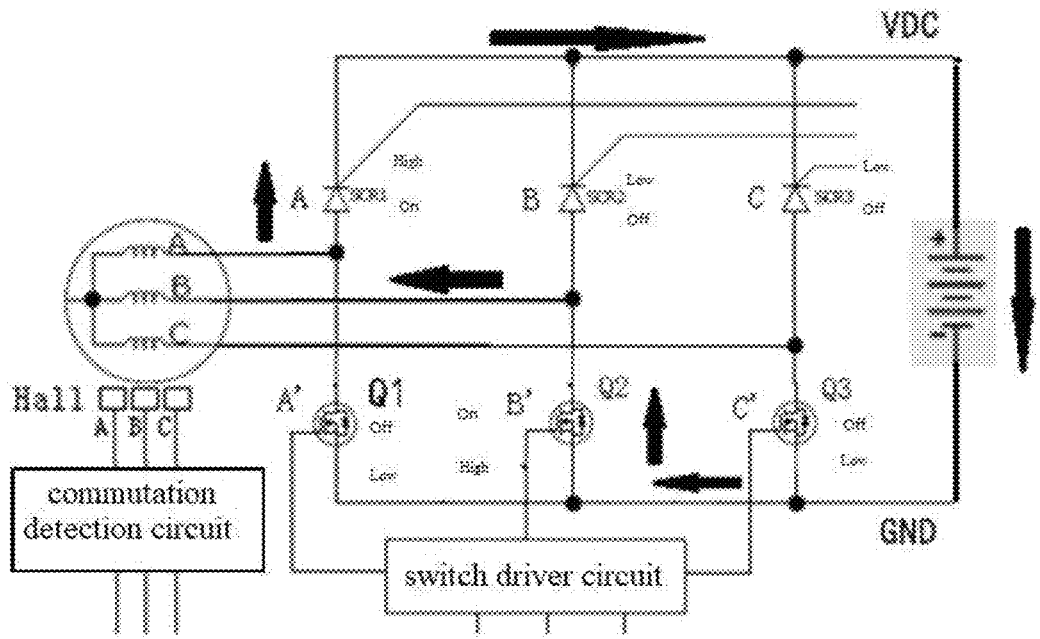
Figure 12:
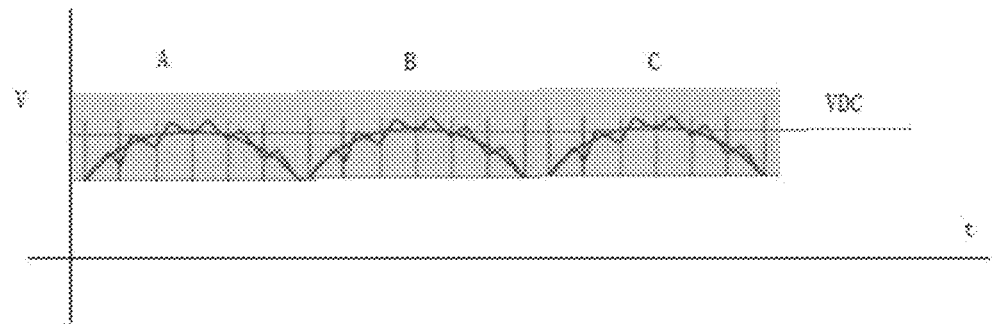
FIG. 12 is a schematic diagram of the output voltage before and after boosting.

Since the switching frequency of the SCR is relatively low, the frequency of PWM chopping is not too high. It is more appropriate to choose about half of the maximum frequency of the SCR (for example, 1 KHz) as the frequency of PWM chopping. FIG. 10 illustrates the current diagram when the lower bridge A' is turned on, AB' is turned on and the PWM chopping boost is performed at the lower bridge A'. FIG. 11 illustrates the current diagram when the lower bridge A' is turned off, AB' is turned on and the PWM chopping boost is performed at the lower bridge A'. FIG. 12 illustrates a schematic diagram of waveform of the output voltage before and after boosting. The smooth curve shows the waveform of the output voltage before boosting. The curve with sharps/spikes shows the waveform of the output voltage after boosting. The original back EMF of the ABC phases is less than VDC. After PWM chopping boost being performed, high voltage peaks with amplitude greater than VDC are generated such that the storage battery 11 can be charged. The boosted output voltage can be adjusted via adjusting the PWM frequency and the PWM duty cycle, For the boost time sequence of each commutation process, the original commutation time sequence is AB', AC', BC', BA', CA', CB'. The method of boost is as follows: when the upper bridge should be closed/conducted/turned on, the corresponding lower bridges perform PWM chopping as shown below:

AB' (lower bridge A' PWM chopping),
AC' (lower bridge A' PWM chopping),
BC' (lower bridge B' PWM chopping),
BA' (lower bridge B' PWM chopping),
CA' (lower bridge C' PWM chopping),
CB' (lower bridge C' PWM chopping)

Figure 13:
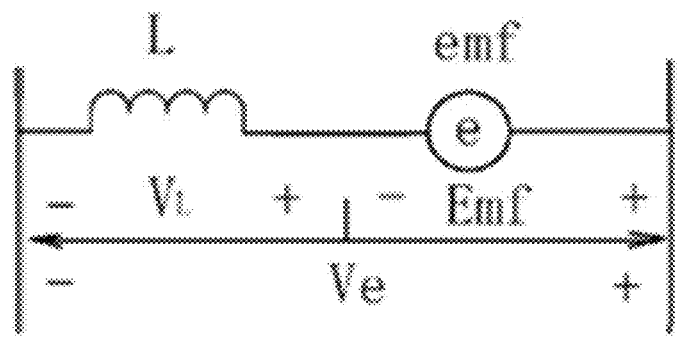
FIG. 13 is an equivalent circuit diagram of an alternating current winding.
Figure 14:
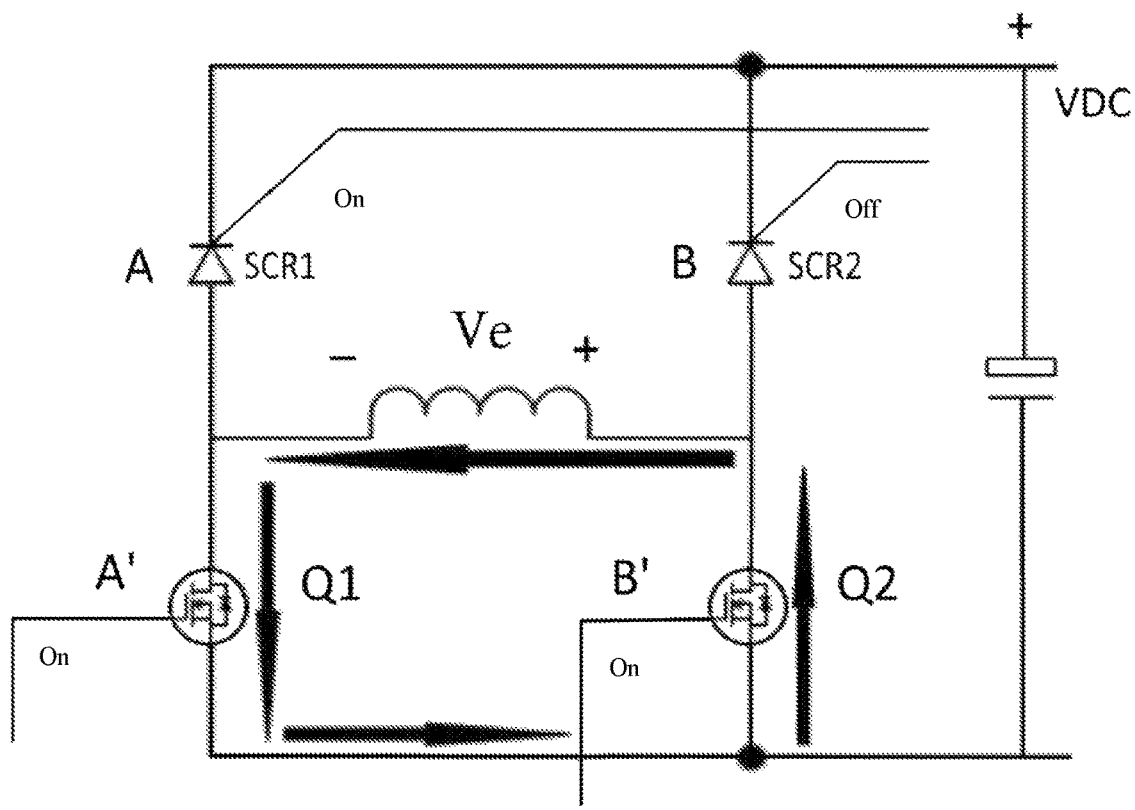
FIG. 14 and FIG. 15 are current diagrams respectively for charging the winding, stopping charging and discharging the winding and boosting.
Figure 15:
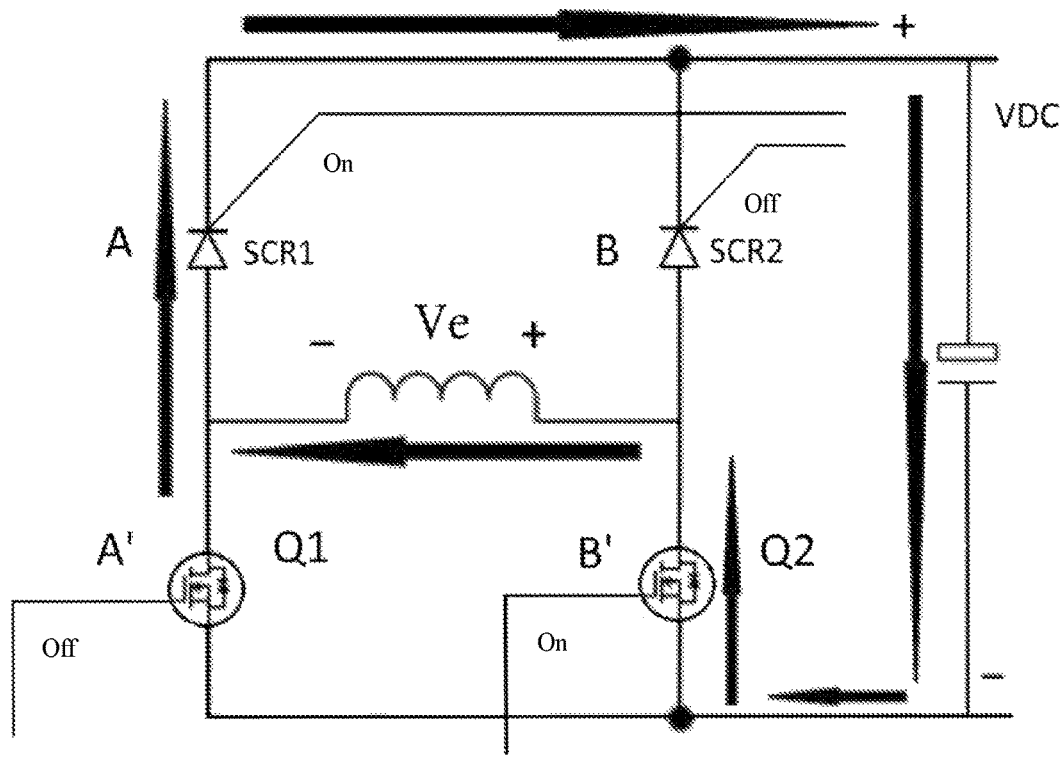

FIG. 13 to FIG. 15 illustrate the principle of boosting during power generation.

FIG. 13 is the equivalent circuit diagram of the alternating current winding, wherein Ve is the voltage across the winding, and Emf is the original electromotive force of the alternating current, VL is the self-induced electromotive force of the winding, VL=L*di/dt, and Ve=Emf+VL.

FIG. 14 is a current diagram for charging the winding, and FIG. 15 is a current diagram for stopping charging and discharging the winding and boosting the current. When A, A', and B' are turned on, the winding will be charged, which corresponds to the open phase of A' PWM.

When the circuit is changed from the condition that A, A', B' are turned on to the condition that A, B' are turned on but A' is turned off (corresponding to the off phase in A' PWM), the turn-off of A' will cause the current i to decrease. According to the principle of self-inductance, the winding will generate the self-induced electromotive force VL along the original current direction. Thus, the total of VL plus Emf can be greater than VDC, and the battery can be charged.

The value of Ve can be adjusted by adjusting the PWM frequency and the duty cycle of PWM signal.

Referring to FIG. 4 again, the upper bridge element can also use a diode and boost during power generation can be achieved. When the electromotive force of the generator/motor is too low, the boost can be carried out through the field effect transistor of the corresponding lower bridge. Since the upper bridge is uncontrollable, the circuit will change the time sequence of each phase according to the natural commutation point, which is the same as the commutation timing of the circuit described above. The boosting method is also the same as the boosting method of the above described circuits and is not repeated here.

Referring to FIG. 5 again, the upper bridge element and the lower bridge element respectively adopt N-channel field effect transistors. The upper bridge element and the lower bridge element are placed in opposite directions. A diode is connected to the top end of the N-channel field effect transistor of each upper bridge. Specifically, the placement direction of the N-channel field effect transistor of the upper bridge is with the D pole at the bottom and the S pole at the top; the placement direction of the N-channel field effect transistor of the lower bridge is with the D pole at the top and the S pole at the bottom. A diode is connected to the top end (S pole) of each N-channel field effect transistor in the upper bridge. Using MOSFETs at the upper bridge has the following advantages: the switching frequency being faster than that of the SCRs, which can avoid excessively high voltage and excessive reverse current caused by the slow switching of the SCRs. When boosting, the boosting method is similar to the boosting method described above except that on-off of the SCR of the upper bridge is changed to on-off of field effect transistors of the upper bridge. When stepping down, the conduction angle can be controlled, which is similar to the conduction angle control method of a general circuit, except that the conduction angle control of the SCR of the upper bridge is changed to the conduction angle control of the field effect transistors of the upper bridge. The use of field effect transistors in the upper bridges can avoid excessively high voltage and excessively high reverse current caused by slow switching of the SCRs.

Referring to FIG. 6 again, each upper bridge uses two N-channel field effect transistors with the drain poles and source poles connected in opposite directions, which has the function of boosting voltage and stepping down voltage during power generation. The circuit can also be used as the PWM speed control circuit of a motor.

In the description and claims of the present application, each of the verbs "comprise", "include", "contain" and "have", and variations thereof, are used in an inclusive sense, to specify the presence of the stated item but not to exclude the presence of additional items.

It will be apparent to those skilled in the art that various modifications and variations can be made to the disclosed structure without departing from the scope or spirit of the invention. For example, in addition to the above-described inner rotor motor, the motor may also be an outer rotor motor, i.e. the rotor is disposed surrounding the stator; the stator core may be an integrated structure as described above as well as a separated structure, which are all within the scope of the present invention. In view of the foregoing, it is intended that the present invention cover modifications and variations of this invention provided they fall within the scope of the following claims and their equivalents.

The invention claimed is:

1. A rectification and boost-buck control system for an alternating current, comprising: a processor; a commutation detection circuit connected between the processor and the alternating current and configured to detect commutation signals; and a rectifier circuit comprising an upper bridge arm circuit and a lower bridge arm circuit respectively connected to corresponding phases of the alternating current, the upper bridge arm circuit comprising a chopper circuit which comprises an upper bridge element connected to the corresponding phase of the alternating current, the lower bridge arm circuit comprising a switch circuit connected between the processor and the chopper circuit, the switch circuit comprising a lower bridge element connected the upper bridge element; wherein based on the communication signals and present output current and/or current rectified voltage, the processor is capable of outputting a conduction angle control signal to the chopper circuit and output a switch control signal to the switch circuit to adjust on-off time of the chopper circuit and the switch circuit to thereby adjust the present output current and/or the current rectified voltage, wherein the alternating current is a three-phase alternating current, the chopper circuit comprises a first silicon controlled rectifier, a second silicon controlled rectifier and a third silicon controlled rectifier respectively connected to three phases of the alternating current; the switch circuit comprises a first switch, a second switch and a third switch respectively connected to the first silicon controlled rectifier, the second silicon controlled rectifier and the third silicon controlled rectifier; and the processor is connected to the first switch, the second switch and the third switch respectively via a switch driver circuit.

2. The control system according to claim 1, wherein the alternating current is supplied by any one of a generator, a transformer and an alternating power.

3. The control system according to claim 1, wherein the upper bridge element comprises a silicon controlled rectifier or a field effect transistor, and the lower bridge element comprises any one of a field effect transistor, a diode and a silicon controlled rectifier.

4. The control system according to claim 1, wherein the first switch, the second switch and the third switch are field effect transistors.

5. The control system according to claim 1, further comprising a chopper driving circuit connected between the processor and the chopper circuit.

6. The control system according to claim 1, further comprising a current detection circuit connected between the processor and the chopper circuit.

7. The control system according to claim 1, wherein the alternating current comprises multiple phases, and the commutation detection circuit comprises multiple commutation detection circuits respectively corresponding to the phases.

8. A control method for alternating current, comprising: acquiring a present output current detected by a current detection circuit and a current rectified voltage detected by a voltage feedback circuit, acquiring a commutation signal detected by a commutation detection circuit, and outputting 4 conduction angle control signal to an upper bridge arm circuit of the alternating current and outputting a switch control signal to a lower bridge arm circuit of the alternating current according to the present output current and/or the present rectified voltage and based on the commutation signal; and turning on upper bridge elements in the upper bridge arm circuit and lower bridge elements in the lower bridge arm circuit according to a target commutation tune sequence, and adjusting on-off time of the upper bridge elements and the lower bridge elements to thereby adjust the present output current and/or the present rectified voltage, wherein the upper bridge elements are silicon controlled rectifiers or field effect transistors, and the lower bridge elements are silicon controlled rectifiers, diodes or field effect transistors: and
  turning on the upper bridge elements in the upper bridge arm circuit and the lower bridge elements in the lower bridge arm circuit according to a target commutation time sequence, and adjusting on-off time of the upper bridge elements and the lower bridge elements to thereby adjust the current output current and the current rectified voltage comprises:
  determining a delay ratio according to a current power demand value, delaying the commutation signal according to the delay ratio, and outputting the conduction angle control signal to the upper bridge arm circuit of the alternating current and the switch control signal to the lower bridge arm circuit of the alternating current based on the delayed commutation signal and the current output current and/or the current rectified voltage.

9. The control method according to claim 8, wherein the lower bridge elements are field effect transistors and the commutation signal is natural commutation point signal.

10. The control method according to claim 8, wherein the lower bridge elements are diodes and the commutation signal is zero-crossing signal.

11. The control method according to claim 8, wherein the lower bridge elements are silicon controlled rectifiers and the commutation signal is natural commutation signal or zero crossing signal.

12. The control method according to claim 8, wherein the lower bridge elements are field effect transistors, and outputting the switch control signal to the lower bridge arm circuit of the alternating current comprises: outputting the switch control signal to the field effect transistors of the lower bridge arm circuit of the alternating current; and performing boosting voltage through a boost circuit and inductances inside the alternating current when the voltage amplitude of the alternating current is lower than a load voltage or a frequency of the alternating current is lower than a set value, and the current output current is less than a predetermined value.

13. The control method according to claim 12, wherein a diode is connected to a top terminal of each N-channel field effect transistor in the upper bridge circuit.

14. The control method according to claim 8, wherein the upper bridge elements and the lower bridge elements are N-channel field effect transistors, connection direction of drain poles and source poles of the N-channel field effect transistors in the upper bridge circuit are opposite to connection direction of drain poles and source poles of the N-channel field effect transistors in the lower bridge circuit.

15. The control method according to claim 8, wherein the upper bridge element comprises two N-channel field effect transistors and connection directions of drains and sources of the two field effect transistors are opposite, and the lower bridge elements are field effect transistors.

* * * * *